United States Patent
Kawka

(10) Patent No.: US 9,993,989 B2
(45) Date of Patent: *Jun. 12, 2018

(54) COMPOSITE SHEET AND CARGO CONTAINER COMPRISING SAME

(71) Applicant: E I DU PONT DE NEMOURS AND COMPANY, Wilmington, DE (US)

(72) Inventor: Dariusz Wlodzimierz Kawka, Midlothian, VA (US)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 95 days.

This patent is subject to a terminal disclaimer.

(21) Appl. No.: 14/806,995

(22) Filed: Jul. 23, 2015

(65) Prior Publication Data

US 2016/0039172 A1 Feb. 11, 2016

Related U.S. Application Data

(60) Provisional application No. 62/035,650, filed on Aug. 11, 2014.

(51) Int. Cl.

| | | |
|---|---|---|
| *B32B 7/12* | (2006.01) | |
| *B32B 5/02* | (2006.01) | |
| *B32B 5/26* | (2006.01) | |
| *B32B 27/12* | (2006.01) | |
| *B32B 27/32* | (2006.01) | |
| *B65D 88/14* | (2006.01) | |
| *B65D 90/02* | (2006.01) | |
| *B65D 90/24* | (2006.01) | |
| *B32B 5/22* | (2006.01) | |
| *B32B 27/28* | (2006.01) | |
| *B32B 27/30* | (2006.01) | |
| *B32B 27/36* | (2006.01) | |
| *B32B 27/40* | (2006.01) | |

(52) U.S. Cl.
CPC ............... *B32B 5/024* (2013.01); *B32B 5/22* (2013.01); *B32B 5/26* (2013.01); *B32B 7/12* (2013.01); *B32B 27/12* (2013.01); *B32B 27/281* (2013.01); *B32B 27/286* (2013.01); *B32B 27/288* (2013.01); *B32B 27/304* (2013.01); *B32B 27/308* (2013.01); *B32B 27/32* (2013.01); *B32B 27/322* (2013.01); *B32B 27/36* (2013.01); *B32B 27/365* (2013.01); *B32B 27/40* (2013.01); *B65D 88/14* (2013.01); *B65D 90/022* (2013.01); *B65D 90/24* (2013.01); *B32B 2255/02* (2013.01); *B32B 2255/26* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2307/306* (2013.01); *B32B 2307/3065* (2013.01); *B32B 2307/50* (2013.01); *B32B 2307/54* (2013.01); *B32B 2307/718* (2013.01); *B32B 2439/00* (2013.01); *B32B 2439/40* (2013.01)

(58) Field of Classification Search
CPC ............ B32B 2255/02; B32B 2255/26; B32B 2260/021; B32B 2260/046; B32B 2262/0269; B32B 2262/101; B32B 2262/106; B32B 2307/306; B32B 2307/3065; B32B 2307/50; B32B 2307/54; B32B 2307/718; B32B 2439/00; B32B 2439/40; B32B 27/12; B32B 27/281; B32B 27/286; B32B 27/288; B32B 27/304; B32B 27/308; B32B 27/32; B32B 27/322; B32B 27/36; B32B 27/365; B32B 27/40; B32B 5/024; B32B 5/22; B32B 5/26; B32B 7/12; B65D 88/14; B65D 90/022; B65D 90/24

See application file for complete search history.

(56) References Cited

U.S. PATENT DOCUMENTS

| | | |
|---|---|---|
| 3,094,511 A | 6/1963 | Hill, Jr. et al. |
| 3,354,127 A | 11/1967 | Hill, Jr. et al. |
| 3,673,143 A | 6/1972 | Bair et al. |
| 3,767,756 A | 10/1973 | Blades |
| 3,819,587 A | 6/1974 | Kwoleck |
| 3,869,429 A | 3/1975 | Blades |
| 3,869,430 A | 3/1975 | Blades |
| 4,172,938 A | 10/1979 | Mera et al. |
| 6,670,291 B1 | 12/2003 | Tompkins et al. |
| 6,884,321 B2 | 4/2005 | Erb, Jr. et al. |
| 8,292,027 B2 | 10/2012 | Richardson, III et al. |
| 9,296,555 B2 * | 3/2016 | Kawka ............ B32B 5/022 |
| 2003/0170418 A1 | 9/2003 | Mormont et al. |
| 2010/0304152 A1 | 12/2010 | Clarke |

(Continued)

FOREIGN PATENT DOCUMENTS

| | | | |
|---|---|---|---|
| WO | 00/32388 A2 | 6/2000 | |
| WO | 02/32663 A1 * | 4/2002 | ............ B32B 27/12 |

OTHER PUBLICATIONS

Definition of Scrim, Dictionary of Fiber & Textile Technology, Hoechst Celanese, p. 136.

(Continued)

*Primary Examiner* — Lawrence Ferguson

(57) ABSTRACT

A non-rigid composite sheet comprising in order
(i) a first component comprising a first fabric of continuous filament yarns having a tenacity of at least 11 g/dtex and a first polymeric layer,
(ii) a second component comprising at least one second fabric of continuous filament glass yarns, the second fabric being adjacent to the first fabric of the first component, and
(iii) a third component comprising a second polymeric layer.

15 Claims, 10 Drawing Sheets

(56) References Cited

U.S. PATENT DOCUMENTS

2012/0103498 A1\* 5/2012 Lamontia ............. B60C 9/0042
　　　　　　　　　　　　　　　　　　　　　152/548
2012/0128959 A1　5/2012 Fernando et al.
2014/0015444 A1　1/2014 Saito et al.

OTHER PUBLICATIONS

Data Sheet—Product Information, Styles 5768, 6580 and 5714; BGF Industries.
Engineered Materials Handbook, vol. 1; Composites, p. 21.
Black, W. et al., Man-Made Fibres, Science and Technology, vol. 2, p. 197, Interscience Publishers, 1968, Section Titled "Fibre-Forming Aromatic Polyamides".
Jacques and Orance, "Development of a Thermal/Acoustic Insulating Blanket Responding to the FAR 25.856 by the Integration of Mica Flame Barrier", Fire and Cabin Safety Research Conference in Lisbon, Nov. 18, 204.

\* cited by examiner

COMPOSITE SHEET AND CARGO CONTAINER COMPRISING SAME

BACKGROUND

1. Field of the Invention

This invention pertains to a non-rigid composite sheet having fire resistant properties. The sheet is useful as walls in a cargo container, particularly containers used in aircraft as well as in other applications where containing the spread of fire is important.

2. Description of Related Art

Cargo containers or unitary load devices (ULDs) are used in aircraft, ships, road vehicles and railcars to carry goods. For economic reasons there is a desire to reduce the weight of an empty container while minimizing its operational cost. Shipment of flammable materials in air cargo containers is creating a serious safety issue for airlines and air cargo carriers. There is increasing concern about the capability of existing containers to contain the spread of fire when the ignition source is the cargo itself. An example of such an ignition source is a lithium-ion battery. Consequently, to prevent possible human casualties and cargo equipment losses, airlines and air cargo carriers are looking for flame resistant cargo containers to contain fires that may originate within the containers. A tightening of regulatory requirements is expected over the next few years. There is therefore a need to provide a light weight cargo container having enhanced capability to contain the spread of fire from within the container that meet stringent durability standards while providing an extended lifetime with minimum maintenance.

U.S. Pat. No. 8,292,027 to Richardson et al describes a composite laminate comprising in order (a) a flame retardant polymeric moisture barrier (b) an inorganic platelet layer and (c) a flame retardant thermoplastic film layer.

United States patent application publication 2003/0170418 to Mormont and Jacques discloses a protection product having thermal and acoustic barrier characteristics such that it satisfies the requirements of the standard 14 CFR, part 25 issued by the Federal Aviation Administration. The product is designed to be applied along metallic and composite structures, such as aircraft cockpits, boat hulls or the outside structures of trains or of other means of transport. The product is essentially in the form of a "mat" consisting of one or several fiber layers, preferably glass fibers, enclosed in a sheath. The sheath generally comprises at least one first support, preferably made of an organic material having sealing and anti-condensation properties, and an impregnated mica paper. The mica paper preferably has a weight per unit area of less than 50 gsm and comprises flakes of mica with a form factor greater than 1000.

U.S. Pat. No. 6,884,321 to Erb at al describes a flame and heat resistant paper having high burnthrough prevention capability, as required in aircraft applications. The paper is prepared from modified aluminum oxide silica fibers, in addition to other components, and has exceptional tensile strength and flexibility as compared to conventional inorganic papers.

United States patent publication number 2010/0304152 to Clarke discloses high hear resistant elastic composite laminates, sealants, adhesives, and coatings developed from a resin blend. The resin blend is made up of methyl and optionally phenyl silsequioxane resins selected to produce silanol-silanol condensation silicone polymers formed in a slowly evolving reaction mass containing submicron boron nitride, silica and boron oxide fillers. The required ratio of submicron boron nitride to silica has been discovered for assuring the formation of a high temperature resistant elastic composite blend that will form intermediate flexible ceramic products up to 600 degrees C., and then continue to form preceramic dense ceramic products from 600 to 1000 degrees C. The thermal yield of the composite is generally greater than 90 wt, % at 1000 degrees C. Composite products with different levels of heat transformation can be fabricated within the same product depending upon the thickness of the layers of reinforcement.

In a presentation entitled "Development of a Thermal/Acoustic Insulating Blanket Responding to the FAR 25.856 by the Integration of Mica Flame Barrier" at the Fire and Cabin Safety Research Conference in Lisbon on Nov. 18, 2004, Jacques and Orance describe the development of a mica paper for use in the construction of an aircraft fuselage.

SUMMARY OF THE INVENTION

This invention is directed to a non-rigid composite sheet comprising in order
  (i) a first component having an areal weight of from 88 to 678 gsm comprising a first fabric of continuous filament yarns having a tenacity of at least 11 g/dtex and a first polymeric layer,
  (ii) a second component comprising at least one second fabric of continuous filament glass yarns, the second fabric being adjacent to the first fabric of the first component, and
  (iii) a third component comprising a second polymeric layer,
  wherein
    (a) the first fabric is a woven fabric having an areal weight of from 70 to 508 gsm comprising yarns of aromatic polyamide, aromatic copolyamide, glass fiber or carbon fiber,
    (b) the polymer of the first and second polymeric layers is polyurethane, polyethylene, polypropylene, polyethylenenaphthalate, polyacrylonitrile, fluoropolymer, polyimide, polyketone, polyimide, polysulfone, polyarlene sulfide, liquid crystal polymer, polycarbonate or an ionomer, and
    (c) when the second fabric is free of a polymeric coating, the fabric has a flame barrier cover of at least 90% when measured over a minimum area of 645 sq. mm. of fabric surface, an areal weight of at least 136 gsm and the fabric comprises fiber having a nominal filament tensile strength of at least 3.4 GPa, or when the second fabric further comprises a polymeric coating on the surface of, or impregnated into the fabric, the coated fabric has a flame barrier cover of at least 90% when measured over a minimum area of 645 sq. mm. of fabric surface, an areal weight of at least 30 gsm and the fabric comprises fiber having a having a nominal filament tensile strength of at least 3.4 GPa and the polymeric coating is present in an amount of from 20 to 50 weight percent of the fabric weight with the proviso that, when the fabric prior to coating has a flame barrier cover of less than 90% and/or the fabric weight prior to coating is less than 135 gsm, then the coating weight is at least 50 gsm.

DETAILED DESCRIPTION

Figure 1A:
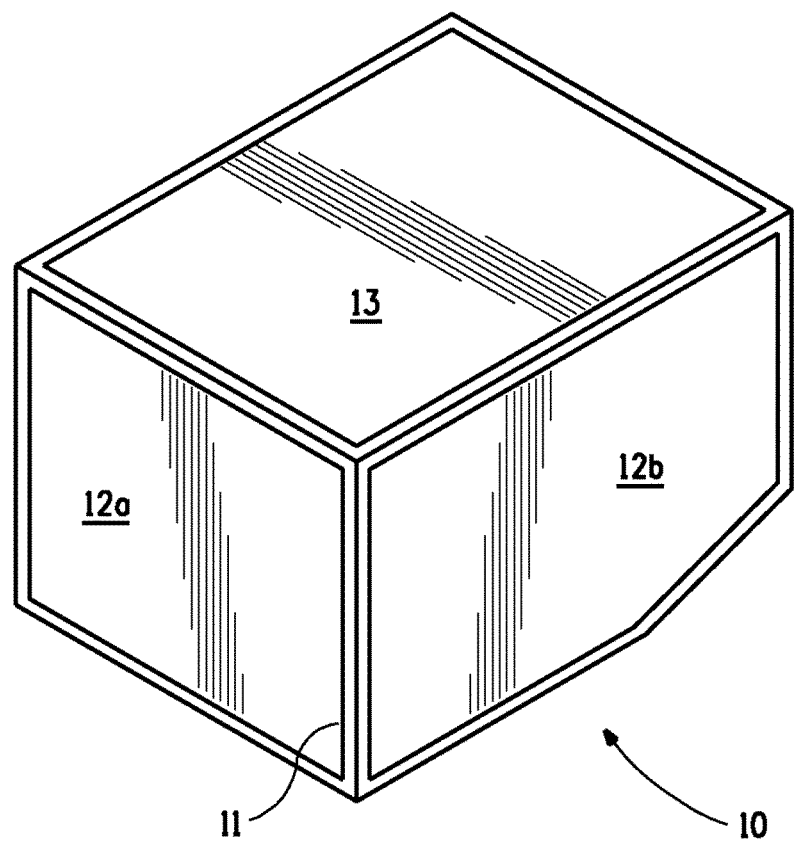
FIGS. 1A and 1B show a perspective of a cargo container.
Figure 1B:
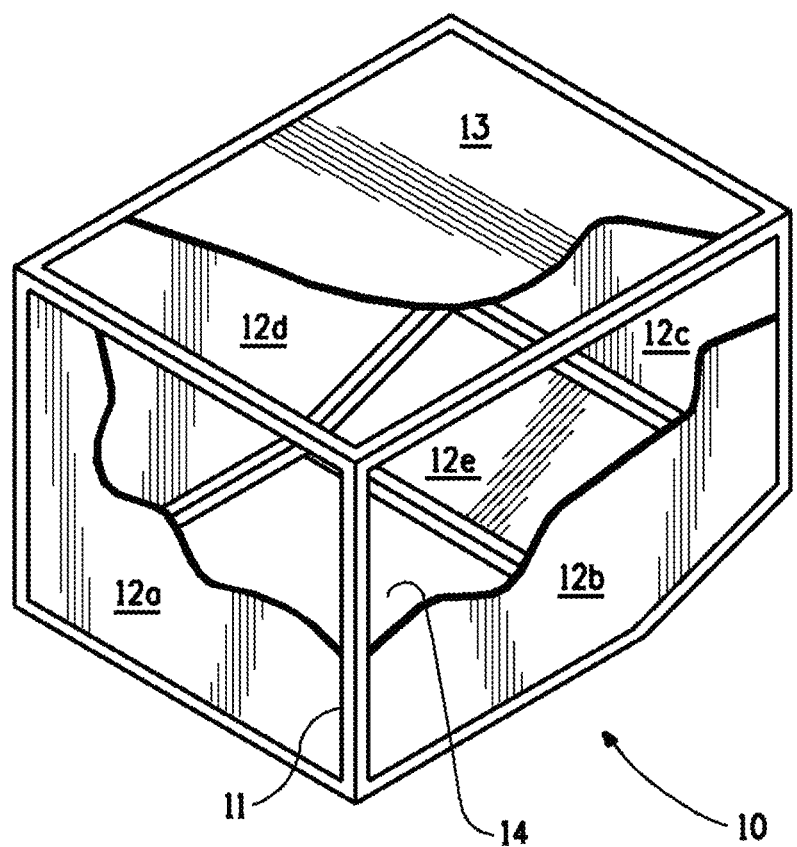

FIG. 1A shows at 10, a perspective of a fire resistant cargo container suitable for aircraft, seagoing vessels and the like for containing the effects of a fire within the cargo container. Shown in FIG. 1A is a frame assembly 11, side walls 12a, and 12b and a top 13. FIG. 2B shows a container comprising a frame assembly 11, a plurality of side walls 12a to 12e, a top 13 and a base 14. The side walls and ceiling comprise a non-rigid flame resistant composite sheet.

Non-Rigid Flame Resistant Composite Sheet

Figure 2A:
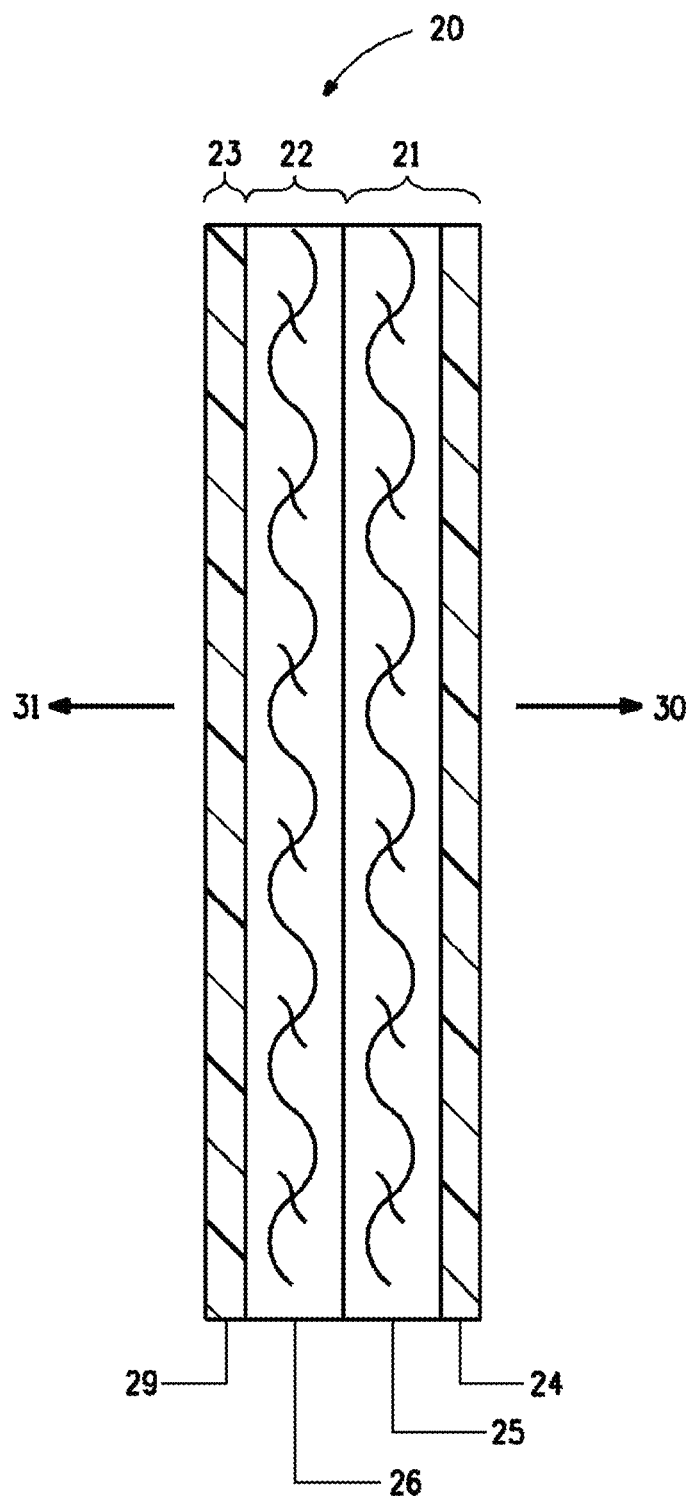
FIGS. 2A to 2D show a cross section through embodiments of a non-rigid composite sheet of this invention.
Figure 2B:
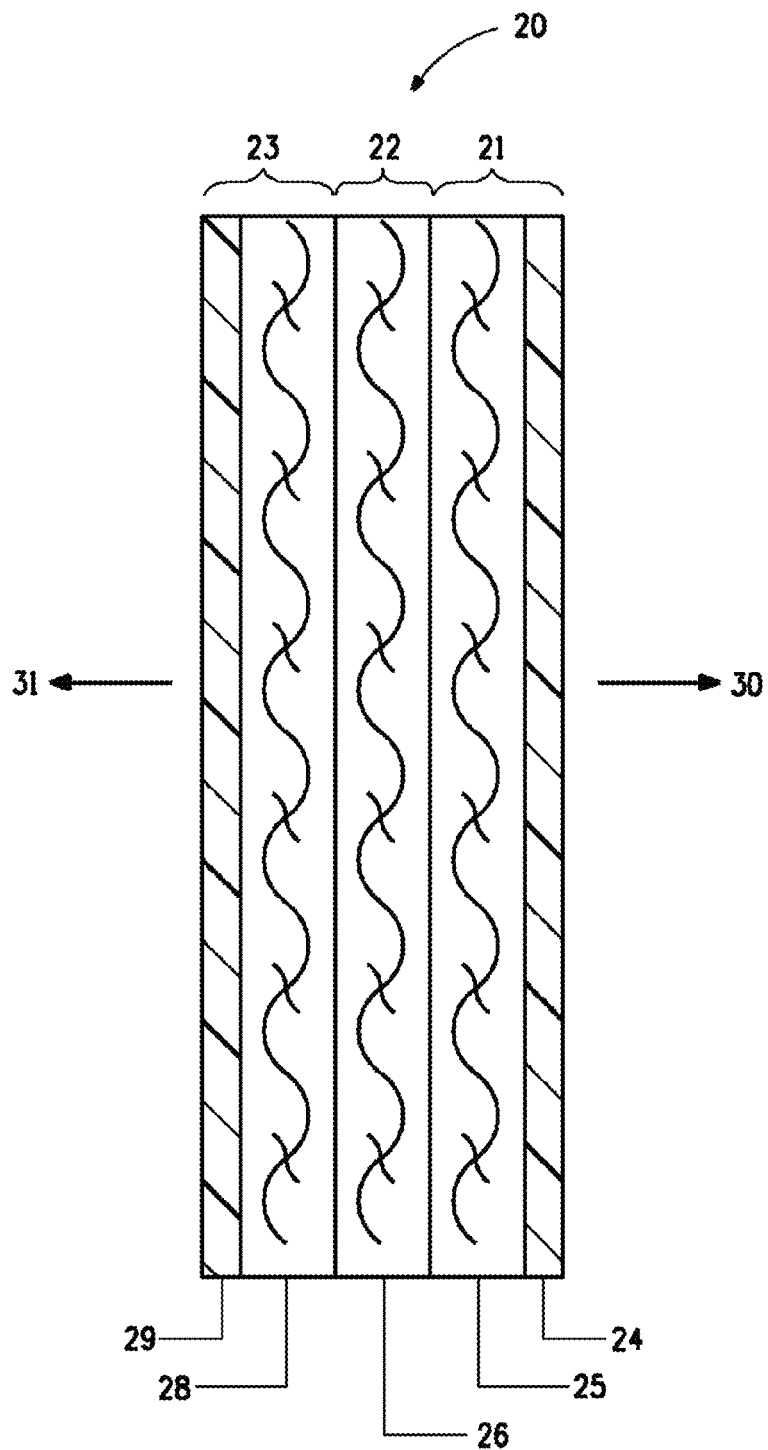
Figure 2C:
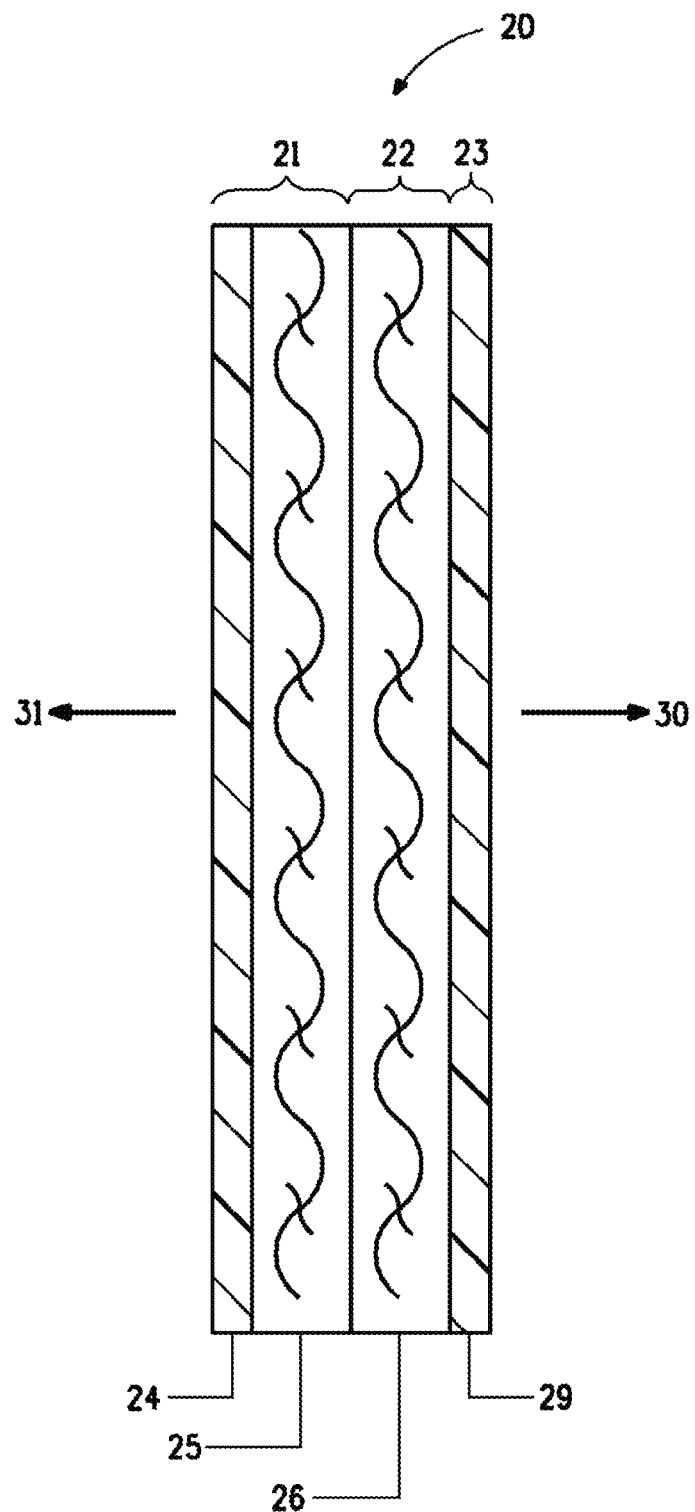
Figure 2D:
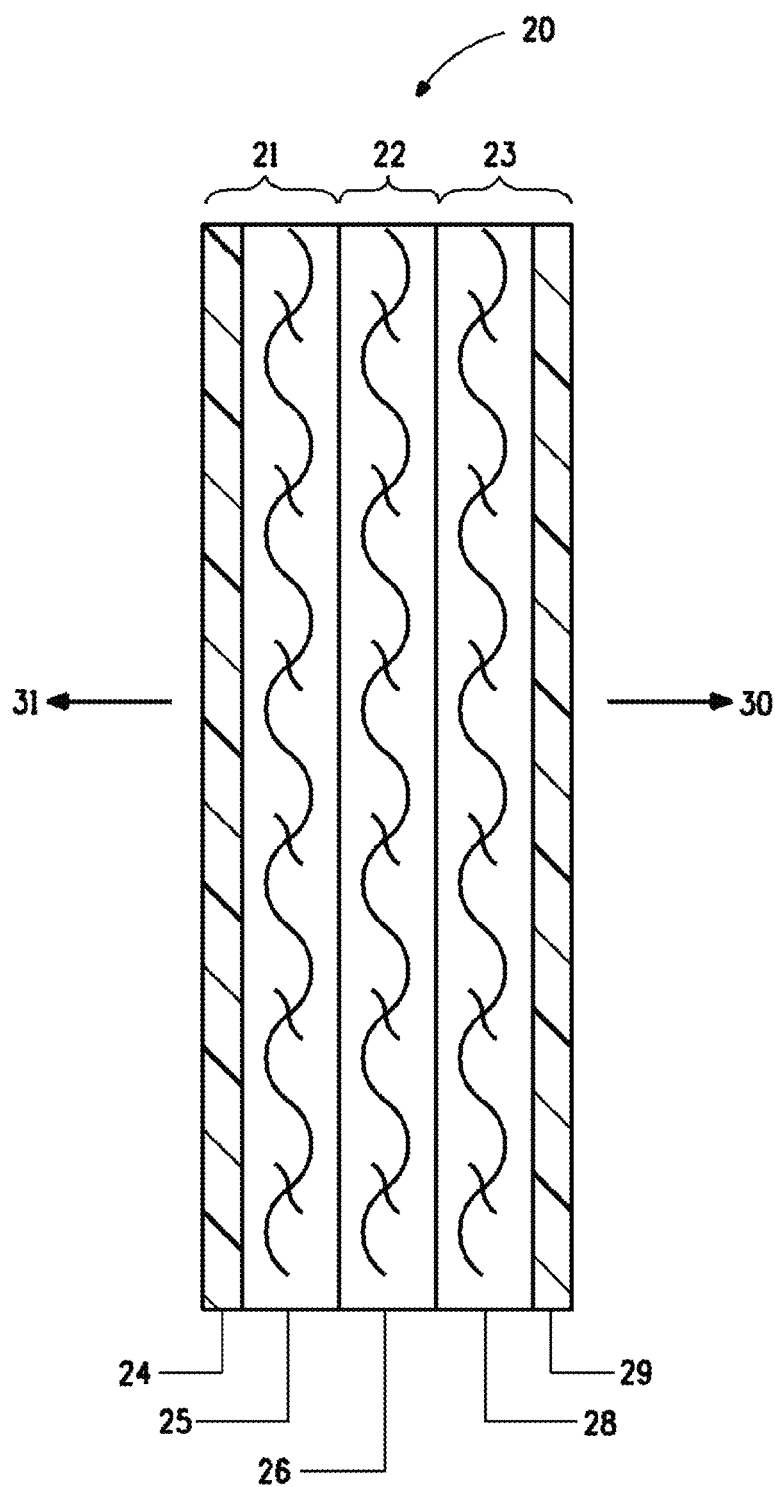

FIG. 2A shows generally at 20 a cross section through one embodiment of a non-rigid flame resistant composite sheet which comprises in order a first component 21, a second component 22 and a third component 23. The sheet is arranged between the frames of a cargo container such that, preferably as shown in FIGS. 2A and 2B, the third component is the innermost component facing towards the cargo 31 and the first component is the outermost component facing away from the cargo 30. In some other embodiments, as shown in FIGS. 2C and 2D, the first component is the innermost component facing towards the cargo 31 and the third component is the outermost component facing away from the cargo 30.

Preferably, the composite sheet has a break strength of at least 175 N/cm (100 lb. per in.). A suitable break strength test is, for example, ISO 13934-1:2013. In some embodiments, the composite sheet has a break strength of at least 525 N/cm (300 lb. per in.) or even of at least 700 N/cm (400 lb. per in.).

Some embodiments of the composite sheet provide a penetration resistance to a direct flame having a temperature of 927° C.+/−38° C. (1700° F.+/−100° F.). Some specifications also require no flame penetration of the specimen within five minutes after application of the flame source, and with the peak temperature measured at 101.6 mm (4 inches) above the upper surface of the horizontal test sample not exceeding 204° C. (400° F.) when tested, for example, according to a flame penetration FAA test method 14 CFR 25.855 Appendix F Part III—Test Method To Determine Flame Penetration Resistance of Cargo Compartment Liner (ceiling position). In some embodiments, the composite sheet provides penetration resistance to a direct flame having a temperature of 927° C.+/−38° C. (1700° F.+/−100° F.) for at least 10 minutes.

Preferably, the composite sheet can withstand exposure to a temperature range of from −50° C. to +80° C. without compromising its reliability and durability over the life span of the end product.

In some embodiments the composite sheet can withstand a full water submersion for at least 24-hour period without compromising its reliability and durability over the life span of the end product.

In some embodiments, the first, second and third components may optionally be bonded to each other by chemical, thermal or mechanical means. An example of chemical means is adhesive bonding. An example of mechanical means is quilting or stapling.

First Component

The first component 21 has an areal weight of from 88 to 678 gsm (2.6 to 20 oz. per sq. yd.) and comprises a first fabric 25 of continuous filament yarns having a tenacity of at least 11 grams per dtex (10 grams per denier) and a first polymeric layer 24, the polymeric layer being the outermost layer of the composite sheet. The polymeric layer provides chemical and environmental (i.e. weather and UV) resistance to both physical and chemical attack and permeation by liquids.

By chemical and environmental/weather resistance is meant that the ability of the polymeric layer to withstand, without excessive degradation, the effects of wind, rain, contaminants such as acidic and/or oily residues found in a typical industrial areas, and sun exposure. Preferably, the polymeric layer has an enhanced ability to resist damage by chemical reactivity, or solvent action, with hydrocarbons, chemicals, ozone, bacteria, fungus, and moisture, as well as skin oils, typically associated with operation and maintenance of a commercial aircraft.

By UV resistant is meant that, when exposed to ultraviolet radiation, the polymeric layer retains its appearance and physical integrity without an excessive degradation of its flexibility and mechanical properties (i.e. brittleness). Preferably, the polymeric layer blocks at least 95% of UV rays, more preferably at least 98% and most preferably 100% of UV rays. UV imperviousness of the first polymeric film can be further mitigated by inclusion of additives in the polymeric material. Examples of such additives include fillers, colors, stabilizers and lubricants. The outer surface of the first polymeric layer that is not in contact with the first fabric may optionally be coated or treated with a UV blocking material.

Ultraviolet (UV) is an invisible band of radiation at the upper end of the visible light spectrum. At wavelengths ranging from 10 to 400 nm, ultraviolet (UV) starts at the end of visible light and ends at the beginning of X-rays. As the primary exposure of the composite sheet to ultraviolet light is the sun, the most critical UV resistance is that to the lower-frequency, longer-wavelength rays.

Preferably, the first polymeric layer has a soft, non-plastic feel that is ideal for products that come in contact with the human skin and maintains its toughness and flexibility over a wide temperature range, even at temperatures as low as −50° C. (−60° F.), over the life span of the product.

In some embodiments, the first fabric layer 25 may be bonded to the first polymeric layer 24 by chemical, thermal or mechanical means. In some embodiments, the first polymeric layer may be impregnated into the first fabric.

In some embodiments, the bond strength between the first fabric and the first polymeric layer is at least 263 N/m (1.5 lb./in). In another embodiment, the bond strength between the first fabric and the first polymeric layer is at least 438 N/m (2.5 lb./in), or even at least 876 N/m (5 lb./in).

When an adhesive is used for chemical bonding, it is preferred that the areal weight of adhesive is between 2 to 40 gsm. The adhesive layer may be a thermoplastic or thermoset resin. Thermoset resins include epoxy, epoxy novolac, phenolic and polyimide. Thermoplastic resins include polyester, polyurethane, polyetherketone, polyetheretherketone, polyetherketoneketone, polyethersulfone, and polyolefin. Thermoplastic resins are preferred.

Preferably, the adhesive layer may optionally contain up to 40 weight percent of a flame retardant ingredient. Suitable flame retardant ingredients include antimony trioxide, halogenated flame retardants including tetrabromobisphenol A, polybrominated biphenyls, pentabromineddiphenylether (oxide), octabrominateddiphenylether(oxide), decabromineddiphenylyether(oxide) and hexabromocyclododecane. Phosphorus containing flame retardants such as those based on organo-phosphate are also suitable.

In some embodiments, the adhesive layer blocks at least 95% of UV rays, more preferably at least 98% and most preferably 100% of UV rays. The adhesive may further comprise fillers, colors, stabilizers, and other performance enhancing additives.

The adhesive must be capable of activation, i.e. forming a bond, at a temperature in the range of 75 to 200 degrees C. In some embodiments, the activation range is from 120 to 140 degrees C. By activation we mean that for a thermoset resin, the resin must cure and bond to the polymeric layer and the fabric within the specified temperature range. For a thermoplastic resin, activation means that the resin softens and flows sufficiently to bond to the polymeric layer and the fabric.

Second Component

The second component 22 comprises at least one second fabric 26 of continuous filament yarns and, when the fabric does not further comprise a polymeric coating, the fabric has an areal weight of at least 136 gsm (4 oz./sq.yd.). The second fabric is adjacent to the first fabric 25 of the first component. In some embodiments, the second fabric has an areal weight of from 170 to 339 gsm (5 to 10 oz./sq.yd.) or from 170 to 237 gsm (5 to 7 oz./sq.yd.) or even from 170 to 203 gsm (5 to 6 oz./sq.yd.). In some other embodiments when the second fabric further comprises a polymeric coating, the second fabric may have an areal weight of at least 30 gsm, more preferably at least 45 gsm.

Preferably the yarns are of glass fiber although fibers of basalt, quartz and other ceramic fibers may also be used. Blends of any of these fibers are also contemplated. Suitable glass fibers include S and E glass. E glass is a commercially available low alkali glass having a nominal filament tensile strength of 3.4 GPa and a nominal filament tensile modulus of 68.9 GPa. The tensile strength and tensile modulus of glass fiber and yarn may be measured, for example, at 22 degrees C. according to ASTM D2101. One typical E glass composition consists of 54 weight % $SiO_2$, 14 weight % $Al_2O_3$, 22 weight % CaO/MgO, 10 weight % $B_2O_3$ and less then 2 weight % $Na_2O/K_2O$. Some other materials may also be present at impurity levels. S-Glass is a commercially available magnesia-alumina-silicate glass having a nominal filament tensile strength of 4.6 GPa and a nominal filament tensile modulus of 86 GPa. This S-glass composition is stiffer and stronger than E-glass and is commonly used in polymer matrix composites. By "nominal" is meant the published strength value for S and E glass filaments in a product data sheet, industry standard or technical literature.

When the second fabric is free of a polymeric coating then, preferably, the fabric has a flame barrier cover of at least 90% when measured over a minimum area of 645 sq. mm. of a representative section of the fabric surface and the fabric comprises fiber having a nominal filament tensile strength of at least 3.4 GPa, more preferably 4.6 GPa. In some embodiments, the flame barrier cover is at least 95%, 98% or even 100%. By representative section of fabric is meant a section of fabric comprising a plurality of warp and weft yarns as exemplified by FIGS. 3-6 having a visual quality that is representative of the visual quality of the fabric as a whole such that the fabric functions as claimed. Edge sections of fabric and fabric sections having defects are not considered to be representative sections. A section having an area where adjacent fabrics are quilted or stitched together is considered to be a representative section.

Figure 3:
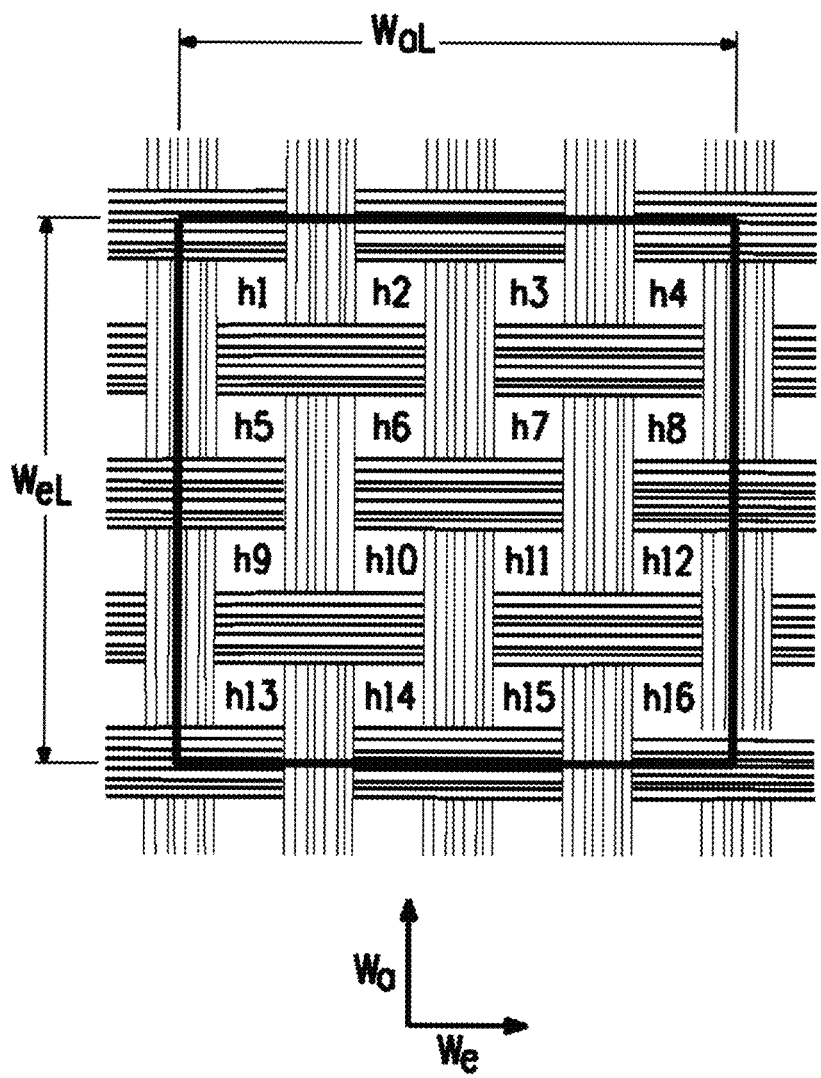
FIG. 3 is a pictorial representation to aid understanding of the calculation of the flame barrier cover.

In the context of this invention, flame barrier cover is a measure of the tightness of a weave in the plane of the fabric (how close adjacent yarns are to each other). This is further explained by reference to FIG. 3 which depicts an enlarged plan view of part of a woven fabric. The warp and weft directions are Wa and We respectively. WaL is the separation length between the centerlines of two warp yarns, in this case two yarns that are four yarns remote from each other. Likewise, WeL is the separation length between the centerlines of two weft yarns, in this case two yarns that are four yarns remote from each other. The respective separation lengths WaL and WeL between these warp and weft yarns enclose a surface area of (WaL×WeL). Within this area are sixteen areas of voids where there are no fibers. These void areas are shown as h1 to h16. The total void area within (WaL×WeL) is the sum of the individual void areas $h_1$ to $h_9$. The flame barrier cover in FIG. 3 is therefore $$\frac{\text{Area }(WaL \times WeL) - \text{Sum of areas}(h1 \text{ to } h16)}{\text{Area }(WaL \times WeL)}$$

An area encompassed by four warp and weft yarns has been chosen for convenience to aid description, however the flame barrier cover can be determined from any number of warp and weft yarns provided that the area to be measured is at least 645 sq. mm. (one square inch) so as to give a meaningful determination of flame barrier cover. More generically, the flame barrier cover formula is $$\frac{\text{Area }(WaL \times WeL) - \text{Sum of Areas}(h1 \text{ to } hn)}{\text{Area }(WaL \times WeL)}$$

where WaL is the length covered by a specific number of adjacent warp yarns, WeL is the length covered by a specific number of adjacent weft yarns and $_n$ is the maximum number of void areas within area WaL×WeL.

The flame barrier cover is determined by a physical examination of the fabric in an "as is intended to be used as a second component" state. The flame barrier cover is best determined by microscopic examination such as by a scanning electron microscope at enlargement levels of 25, 50 or 100.

As defined herein, polymeric coating excludes ingredients such as coupling agents, lubricants, binders and surface treatment applied by a weaver as part of a fabric finish (greige state) to aid bonding or coating to the fabric. The polymeric coating provides some functionality to the fabric that is different from the functionality of the weaver finishes.

In some embodiments, the second component further comprises a polymeric coating on the surface of, or impregnated into the second fabric. Alternatively, the coating may be a separate layer. When this coating is a separate layer, or predominantly applied on one side of the fabric, then it is preferred that the composite is assembled such that coating is on the innermost side of the second fabric. Preferably, the coating is present in an amount of at least 20 weight percent of the fabric weight with the proviso that, when the fabric prior to coating has a flame barrier cover of less than 90% and/or the fabric weight prior to coating is less than 135 gsm (4 oz./sq. yd), then the coating weight is at least 50 gsm. More preferably, the coating is present in an amount of from 20 to 50 weight percent of the fabric weight In some embodiments, the coating is present in an amount of from 20 to 40 or even 25 to 35 weight percent of the fabric weight. In one embodiment, the coating is present in an amount of about 30 weight percent of the fabric weight. The function of this coating is to enhance the second component as a flame and hot gas impermeable barrier.

In these embodiments the coated fabric has a flame barrier cover of at least 90% when measured over a minimum area of 645 sq. mm, of a representative section of the coated fabric surface and the fabric comprises fiber having a nominal filament tensile strength of at least 3.4 GPa. In some embodiments, the flame barrier cover is at least 95%, 98% or even 100%. Application of a polymeric coating permits the use of uncoated fabrics having a flame barrier cover at less than 90% when measured over a minimum area of 645 sq. mm. of a representative section of the uncoated fabric surface provided that, after coating, the flame barrier cover of the coated fabric is at least 90% when measured over a minimum area of 645 sq. mm. of a representative section of the coated fabric surface. That is to say, the polymeric coating fills in some of the voids in the fabric to provide the required flame barrier cover value.

In some other embodiments, the coated fabric may have a flame barrier cover of less than 90% but, during exposure to heat or flame, the polymeric coating must activate and expand to provide a flame barrier cover of at least 90% by the time that the temperature in the environment of the composite reaches 800 degrees C.

A suitable polymeric material is a polysiloxane resin. An exemplary polysiloxane resin is methyl or phenyl silsequioxane comprising submicron filler components such as boron nitride, boron oxide or silica. Such a material is available from Flexible Ceramics Inc, Palm Springs, Calif. This polymeric material enables the second component to remain non-brittle and flexible, i.e. non-rigid, while in the "C" stage. The second component only starts to become rigid when exposed to a flame temperature of at least 600 degrees C. "C" stage is a term well known in the polymeric field to indicate when a resin is fully cured. The polymer has also been found to contribute to the effectiveness of the flame barrier without causing detriment to the flexibility of the laminate. Other suitable polymers are inorganic silicone based polymers, polyureasilazane, polycarbosilane, polysilazane, polysiloxane and silicon-carboxyl resin.

In some embodiments, the second component further comprises an inorganic refractory material that is adjacent to the second fabric and is present in an amount of from 3-10 or even 3-6 weight percent of the second fabric weight. The inorganic refractory coating may be on the surface of, or impregnated into the second fabric. Alternatively, the coating may be a separate layer. When this coating is a separate layer, then it is preferred that the composite is assembled such that coating is on the innermost side of the second fabric. This inorganic material may be present whether or not there is a polymeric coating on the second fabric of the second component. Exemplary inorganic refractory materials are clay, such as montmorillonite, vermiculite, mica, talc, ceramic and combinations thereof. The function of this refractory material is to further enhance flame and hot gas barrier properties of the second component. Vermiculite is a hydrated magnesium aluminosilicate micaceous mineral found in nature as a multilayer crystal. Vermiculite typically comprises by (dry) weight, on a theoretical oxide basis, about 38-46% $SiO_2$, about 16-24% MgO, about 11-16% $Al_2O_3$, about 8-13% $Fe_2O_3$ and the remainder generally oxides of K, Ca, Ti, Mn, Cr, Na, and Ba. "Exfoliated" vermiculite refers to vermiculite that has been treated, chemically or with heat, to expand and separate the layers of the crystal, yielding high aspect ratio vermiculite platelets. Suitable vermiculite materials are available from Specialty Vermiculite Corp., Enores, S.C. under the trade designations MicroLite 963 and MicroLite HTS-XE. The thickness of an individual vermiculite platelet typically ranges from about 5 Angstroms to about 5,000 Angstroms more preferably from about 10 Angstroms to about 4,200 Angstroms. The mean value of the maximum width of a platelet typically ranges from about 10,000 Angstroms to about 30,000 Angstroms. The aspect ratio of an individual platelet typically ranges from 100 to 20,000.

Mica is a crystallized mineral silicate in a variety of monoclinic forms that readily separates into very thin leaves or platelets. Examples of mica are grannitic potassium and pyroxenic mica. In some embodiments, the mica has a flat particle size of 100 to 500 microns and a thickness of 0.05 to 0.15 micrometers.

A preferred fabric for the second component is an uncoated fabric comprising S-glass yarns having a flame barrier cover of at least 90% and a fabric weight of at least 135 gsm (4 oz/sq.yd.).

In some embodiments the second fabric is quilted by a yarn to improve its structural integrity and to minimize or eliminate tear propagation. Suitable quilting yarns are those of aromatic polyamide, glass or flame retardant (fr) treated cotton or fr cellulose. Any suitable quilting pattern may be used. In some embodiments, the distance between adjacent rows of quilt stitches may be about 25.4 mm. Quilting is a well-known technique in the textile art.

The second component may optionally be bonded to the first component by chemical, thermal or mechanical means. A suitable adhesive is that previously described for use in the first component. In some embodiments, when the fabric of the first component is bonded to the fabric of the second component, the bond strength between the two fabrics is at least 87 N/m (0.5 lb./in) or at least 175 N/m (1.0 lb./in). Preferably, the bond strength is at least 263 N/m (1.5 lb./in). In another embodiment, the bond strength between the two components is at least 438 Wm (2.5 lb./in), or even at least 876 N/m (5 lb./in).

In some embodiments the second fabric is scoured or heat cleaned after weaving. Such processes are well known in the textile industry to remove contaminants such as oil from the weaving process.

When there are a plurality of second fabrics in the second component, all of the fabrics may be uncoated, or coated or comprise a mixture of uncoated and coated fabrics. Where there are a mixture of coated and uncoated fabrics, it is preferred that the coated fabrics are on the innermost side of the second component. The plurality of second fabrics may, or may not, be bonded or quilted together or may comprise a mixture of bonded or quilted fabrics and unbonded fabrics.

Third Component

In one embodiment, as in FIG. 2A, the third component 23 comprises a second polymeric layer 29 having an areal weight of at least 17 gsm (0.5 oz./sq.yd.). In other embodiments, the areal weight is from 17 to 170 gsm (0.5 to 5 oz./sq.yd.). The second polymeric layer is the outermost layer of the third component. The second polymeric layer provides enhanced abrasion/scuff and puncture resistance, improved impact toughness as well as an enhanced resistance to physical mistreatment, chemical contact attack and permeation by liquids.

Preferably, the second polymeric layer maintains its toughness and flexibility over a wide temperature range, even at temperatures as low as −50° C. (−60° F.) over the life span of the end product.

In some other embodiments, as in FIG. 2B, the third component 23 has an areal weight of from 88 to 678 gsm (2.6 to 20 oz. per sq. yd.) and comprises a third fabric 28 of continuous filament yarns preferably having a tenacity of at least 11 grams per dtex (10 grams per denier) and second polymeric layer 29, the third fabric 28 of the third component 23 being adjacent to the second component 22. The third fabric 28 may optionally be bonded to the second polymeric layer 29 by chemical, thermal or mechanical means. A suitable adhesive is that previously described for use in the first component. The bond between the third fabric 28 and the second polymeric layer 29 is at least 263 N/m (1.5 lb./in). In some embodiments, the bond is at least 315 N/m (1.8 lb./in), or even 876 N/m (5 lb./in). In some embodiments, the second polymeric layer may be impregnated into the third fabric.

In some embodiments, the second component 22 may be bonded to the third component 23 by chemical, thermal or mechanical means. A suitable adhesive is that previously described for use in the first component. When the fabric of the first component is bonded to the fabric of the second component, the bond strength between the two fabrics is at least 87 N/m (0.5 lb./in) or at least 175 N/m (1.0 lb./in). Preferably, the bond is at least 263 N/m (1.5 lb./in). In some embodiments, the bond is at least 315 N/m (1.8 lb./in), or even 876 N/m (5 lb./in).

First and Third Fabrics

In some embodiments the first fabric or, when present, the third fabric has an areal weight of from 70 to 508 gsm (2.1 to 15 oz. per sq. yd.). In some other embodiments, the first or third fabric areal weight is from 101 to 373 gsm (3 to 11 oz. per sq. yd.). In some embodiments, the first or third fabrics have an areal weight of from 101 to 170 gsm (3 to 5 oz. per sq. yd.). In some embodiments, the third fabric has an areal weight of from 170 to 270 gsm (5 to 8 oz. per sq. yd.). The first and third components may comprise a plurality of respective first and third fabrics.

In some embodiments, the first and second fabrics are quilted together by a yarn. In some other embodiments, the second and third fabrics may be quilted together A structure can also be envisaged in which the first, second and third components are quilted together. Suitable quilting yarns are those of aromatic polyamide, glass or flame retardant (fr) treated cotton or fr cellulose. Any suitable quilting pattern may be used. In some embodiments, the distance between adjacent rows of quilt stitches may be about 25.4 mm.

The first or third fabrics may be woven or non-woven. Typical woven fabric styles are plain, basket, leno twill or satin weaves. In one embodiment, the first and/or third fabric is a plain weave fabric comprising 555 dtex (500 denier) KM2 p-aramid yarns in an amount of 11 ends per cm (28 ends per inch) in both warp and weft directions. In another embodiment, the first and/or third fabric is a plain weave fabric comprising 1111 dtex (1000 denier) KM2 p-aramid yarns in an amount of 9.4 ends per cm (24 ends per inch) in both warp and weft directions.

The fine denier yarn of the fabric combined with a tough first or second polymeric film layer leads to a significant enhancement in puncture resistance, and thus overall durability, of the non-rigid composite sheet.

Nonwoven fabrics include fabrics in which the filaments are arranged in a random orientation or fabrics comprising filaments that are aligned in only one direction. This latter type of fabric is also known as a non-crimped or unidirectional fabric.

In some embodiments the first and/or third fabrics are scoured or heat cleaned after weaving. Such processes are well known in the textile industry to remove contaminants such as oil from the weaving process. Preferably, the filamentary yarns of the first and third fabrics comprise aromatic polyamide or aromatic copolyamide. Glass fiber and carbon fiber, especially carbon fiber based on polyacrylonitrile, may also be used.

The fabrics 25 and 28 are made from multifilament yarns having a plurality of filaments. The yarns can be intertwined and/or twisted. For purposes herein, the term "filament" is defined as a relatively flexible, macroscopically homogeneous body having a high ratio of length to width across its cross-sectional area perpendicular to its length. The filament cross section can be any shape, but is typically circular or bean shaped. Herein, the term "fiber" is used interchangeably with the term "filament", and the term "end" is used interchangeably with the term "yarn".

The filaments can be any length. Preferably the filaments are continuous. Multifilament yarn spun onto a bobbin in a package contains a plurality of continuous filaments. The multifilament yarn can be cut into staple fibers and made into a spun staple yarn suitable for use in the present invention. The staple fiber can have a length of about 1.5 to about 5 inches (about 3.8 cm to about 12.7 cm). The staple fiber can be straight (i.e., non crimped) or crimped to have a saw tooth shaped crimp along its length, with a crimp (or repeating bend) frequency of about 3.5 to about 18 crimps per inch (about 1.4 to about 7.1 crimps per cm).

In some embodiments, the yarns have a yarn tenacity of at least 11 grams per dtex and a modulus of at least 100 grams per dtex. In some embodiments, the yarns have a linear density of from 333 to 2222 dtex (300 to 2000 denier) or from 555 to 1111 dtex (500 to 1000 denier). In some embodiments, the yarns of the first or third fabrics have a linear density of 555 dtex or of 1111 dtex.

When the polymer is polyamide, aramid is preferred. The term "aramid" means a polyamide wherein at least 85% of the amide (—CONH—) linkages are attached directly to two aromatic rings. Suitable aramid fibers are described in Man-Made Fibres—Science and Technology, Volume 2, Section titled Fibre-Forming Aromatic Polyamides, page 297, W. Black et al., Interscience Publishers, 1968. Aramid fibers and their production are, also, disclosed in U.S. Pat. Nos. 3,767,756; 4,172,938; 3,869,429; 3,869,430; 3,819,587; 3,673,143; 3,354,127; and 3,094,511.

The preferred aramid is a para-aramid. The preferred para-aramid is poly(p-phenylene terephthalamide) which is called PPD-T. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

Another suitable fiber is one based on aromatic copolyamide prepared by reaction of terephthaloyl chloride (TPA) with a 50/50 mole ratio of p-phenylene diamine (PPD) and 3,4'-diaminodiphenyl ether (DPE). Yet another suitable fiber is that formed by polycondensation reaction of two diamines, p-phenylene diamine and 5-amino-2-(p-aminophenyl)benzimidazole with terephthalic acid or anhydrides or acid chloride derivatives of these monomers.

Suitable glass fibers are E and S glass compositions as previously described for the second fabric.

In some embodiments the carbon fiber is a standard or intermediate modulus fiber such as those available under the tradename Torayca from Toray Industries or HexTow from Hexcel Corporation. Typically, such fibers have 3,000 or 6,000 or 12,000 or 24,000 filaments per tow.

In some embodiments first and/or third fabrics may optionally be treated with a flame retardant ingredient to aid flame propagation properties of the non-rigid Flame Resistant Composite. Suitable flame retardant ingredients include antimony trioxide, halogenated flame retardants including tetrabromobisphenol A, polybrominated biphenyls, pentabrominateddiphenylether(oxide), octabrominateddiphenylether(oxide), decabrominateddiphenylyether(oxide) and hexabromocyclododecane. Phosphorus containing flame retardants such as those based on organo-phosphate are also widely used.

In some embodiments, the first and third fabrics may comprise the polymeric resins and/or the inorganic refractory materials previously described for the second fabric of the second component. The materials may be present in any convenient amount. Although there is no particular requirement for a flame barrier cover for the first and third fabrics, a tighter weave is preferred.

First and Second Polymeric Layers

The polymer of the first or second or both polymeric layers may be a thermoplastic or thermoset polymer. A thermoplastic polymer is preferred. The first and second polymeric layers may comprise the same or different polymers.

In a preferred embodiment, the first and second polymeric layers are in a form of a self-supporting film.

Suitable polymers include polyurethane, polyethylene, polypropylene, polyethylenenaphthalate, polyacrylonitrile, fluoropolymer, polyimide, polyketone, polyimide (Kaplon®), polysulfone, polyarlene sulfide, liquid crystal polymer, polycarbonate, and ionomers such as ethylenernethacrylicacid copolymer (EMAA). In some embodiments, a fluoropolymer is preferred.

Exemplary fluoropolymers include polyvinylfluoride (Tedlar®), etyhylenechlorotrifluoroethylene copolymer (Halar®) and polytetrafluroethylene (Teflon®). Exemplary polyketones include polyetheretherketone (PEEK) and polyetherketoneketone (PEKK).

In one embodiment, the first, second or even both polymeric layers comprise polyvinylfluoride (PVF). A suitable PVF is available under the tradename Tedlar from E. I. DuPont and Company, Wilmington, Del., hereinafter "DuPont". In another embodiment, the second polymeric layer is an ionomeric resin such as ethylenemethacrylicacid copolymer. In yet another embodiment, the first polymeric layer is non-transparent and impervious to UV rays. By non-transparent and impervious to UV rays we mean that the first polymeric layer blocks at least 95% of UV rays, more preferably at least 98% and most preferably 100% of UV rays especially those rays at the upper end of the UV spectrum.

In some embodiments the first and/or second polymeric layers have an areal weight of 17 to 170 gsm (0.5 to 5 oz. per sq. yd.) or from 17 to 102 gsm (0.5 to 3 oz. per sq. yd.) or even from 17 to 64 gsm (0.5 to 2 oz. per sq. yd.).

In some embodiments, at least one surface of the first and/or second polymeric layers may be metalized. Preferably in the composite sheet, the metalized surface is on the side of the polymeric layer adjacent to the first or third fabrics.

In some embodiments, the first and, optionally, the second polymeric layer opens up when exposed to a heat in excess of 600 degrees C. preventing accumulation of flammable vapor from a thermal decomposition of the organic materials in the composite. This feature is an important safety measure to prevent flashovers.

A flashover is a near-simultaneous ignition of part of the exposed material when accumulated flammable vapor created during thermal decomposition of the organic materials in the composite are trapped by the decomposing first polymeric layer and reach their auto-ignition temperature before the vapors can safely dissipate into the surrounding area.

Use

The composite sheet as described herein can find use in many applications where protection against flame and fire is required. Examples include the sidewalls and ceiling of a cargo container, a fire-resistant cover, a separator such as is used in a battery and a blanket or liner as may be used in an aircraft, train or building.

Test Methods

The composite sheets were tested according to 14 CFR 25.855 Appendix F Part III—Test Method To Determine Flame Penetration Resistance of Cargo Compartment Liner. AH examples were tested three times except for Example 1 which was tested six times and Example 5 which was tested once.

Tensile properties of the composite sheet were determined by ISO 13934-1:2013 Standard Test Method for Tensile Properties of Fabrics.

Air permeability of the uncoated fabrics was tested by Frazier Air Permeability which is a measure of air permeability of porous materials and is reported in units of $ft^3/min/ft^2$, frequently referred to as cubic feet per minute (cfm). It measures the volume of air flow through a material at a differential pressure of 0.5 inches (12.7 mm) of water. An orifice is mounted in a vacuum system to restrict flow of air through the sample to a measurable amount. The size of the orifice depends on the porosity of the material (setting 4 was used for 6781 and 6580 fabrics and setting 7 was used for 6522 fabric). Frazier permeability was measured in units of $ft^3/min/ft^2$ using a Sherman W. Frazier Co. dual manometer with calibrated orifice. All fabric samples were measured 5 times at several locations with a standard commercial FX 3300 Air Permeability tester (Frazier) at 125 Pa over a 38 $cm^2$ area. The results are presented as an average value of the five tests.

Flame barrier cover values were estimated over a fabric surface area of 645 sq. mm of a representative section of the fabric.

The surface release value of the release paper was measured according to ASTM D1876-08 Standard Test Method for Peel Resistance of Adhesives (T-Peel Test).

EXAMPLES

Examples prepared according to the current invention are indicated by numerical values. Control or Comparative Examples are indicated by letters.

All fabrics were supplied unfinished in greige state.

Example 1

A non-rigid composite sheet was prepared.

First Component

The first component comprised a woven fabric (first fabric) thermally bonded to a non-transparent 0.075 mm (3 mil) cast polyurethane film (first polymeric layer). The fabric, style 5768 from BGF Industries, Greensboro, N.C., had an area weight of 122 gsm (3.6 oz./sq.yd.). The fabric was a plain weave having 28 ends per inch in both warp and weft and was woven from 556 dtex (500 denier) p-aramid Kevlar® are KM2+ yarns, merge 1W034. The yarns had a nominal tenacity of 31 g/dtex. The bond strength between first polymeric film and first fabric was tested to be at least 437 N/m (2.5 lb./in).

Second Component

Figure 4:
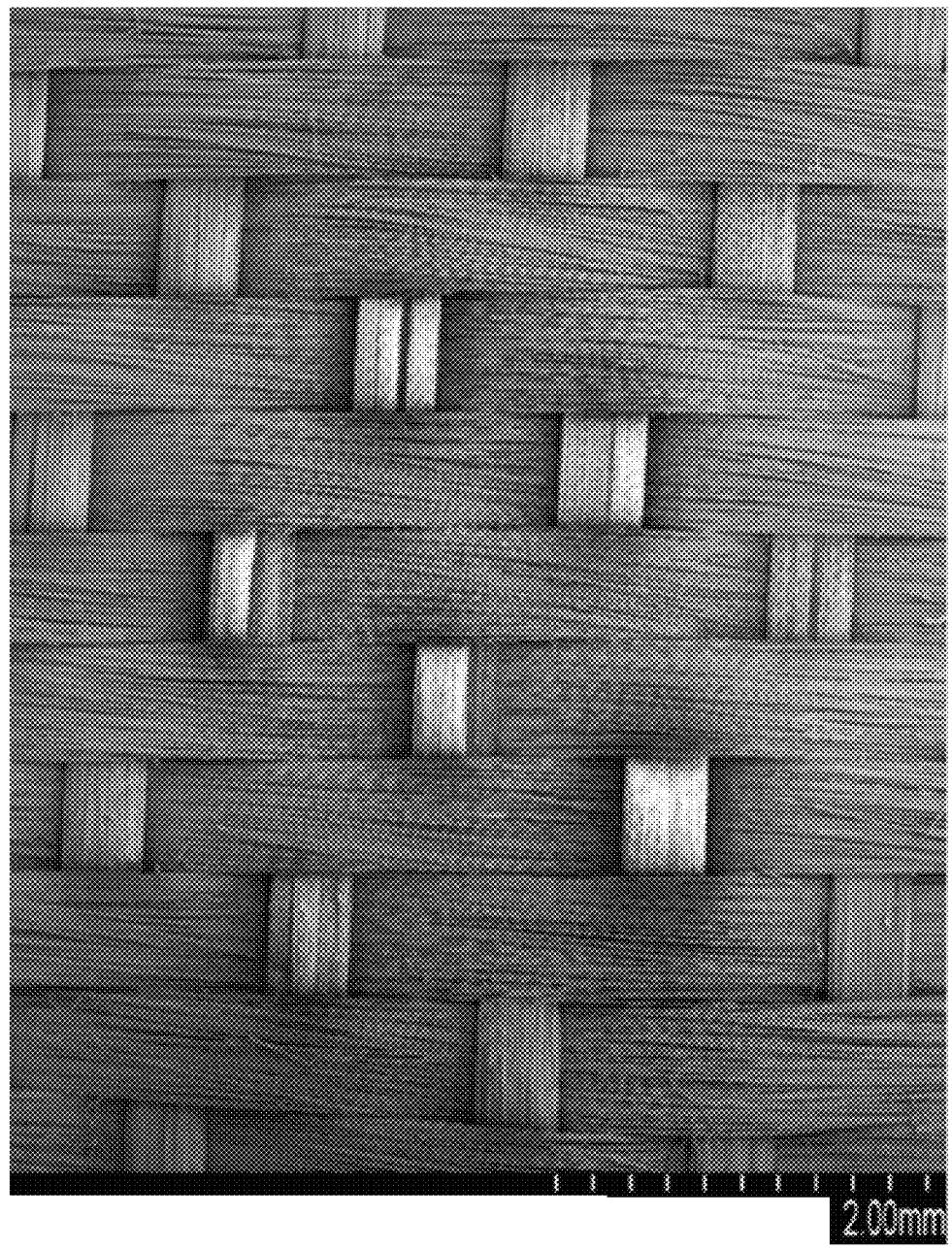
FIGS. 4 to 6 are digital reproductions of scanning electron micrographic images of fabrics used in the examples.

The second component, fabric style 6580 from BGF Industries comprised an 8-harness satin weave fabric of continuous filament S-glass yarns (SCG 150 1/0). Based on a scanning electron micrograph image at a magnification level of 25 as shown in FIG. 4, the flame barrier cover was estimated to be at least 99.5%. There were 73 ends per inch (28.7 ends per cm) in the warp and 70 ends per inch (27.5 ends per cm) in the weft or fill. The fabric had an area weight of 5.58 oz./sq.yd. (189 gsm) and a Frazier Air Permeability 28.4 cu. ft./min. No polymeric resin or inorganic refractory coating was applied to the fabric.

Third Component

The third component, supplied by BGF Industries comprised a woven fabric (third fabric) thermally bonded to a second polymeric layer, a clear 3-mil ethylene acid copolymer film (Surlyn® grade 1652, having an area weight of 76 gsm). The third fabric style 5714 from BGF Industries had an aerial weight of 220 gsm (6.5 oz./sq.yd.). The fabric was a plain weave having 24 ends per inch (9.4 ends/cm) in both warp and weft and was woven from 1111 dtex (1000 denier) p-aramid Kevlar® KM2 yarns, merge 1W041. The bond strength between second polymeric film and third fabric was tested to be at least 262 N/m (1.5 lb/in).

The first, second and third components were assembled together as shown in FIG. 2A. The second component was thermally bonded to the first and third components with a layer of 0.025 mm (1 mil) thick polyurethane adhesive film containing up to 50 weight percent of a flame retardant ingredient. The composite sheet had a tensile strength of 414 N/cm (237 lb).

The fabricated composite sheet was subjected to the flame penetration test. The test sample was in a ceiling position with the Surlyn® film side of the composite facing the flame. The sample showed a good resistance to flame penetration, with the second component acting as an effective barrier to 927° C.+/−38° C. (1700° F.+/−100° F.) flame, with no flame penetration of the specimen within 5 minutes after application of the flame source. The peak temperature measured at 4 inches above the upper surface of the horizontal test sample did not exceed 204° C. (400° F.). Two of the examples experienced a flash over incident each incident occurring within the first 90 seconds of the test and lasting for up to 30 seconds. In neither of the incidents was the second component breached by the flame.

Comparative Example A

Figure 5:
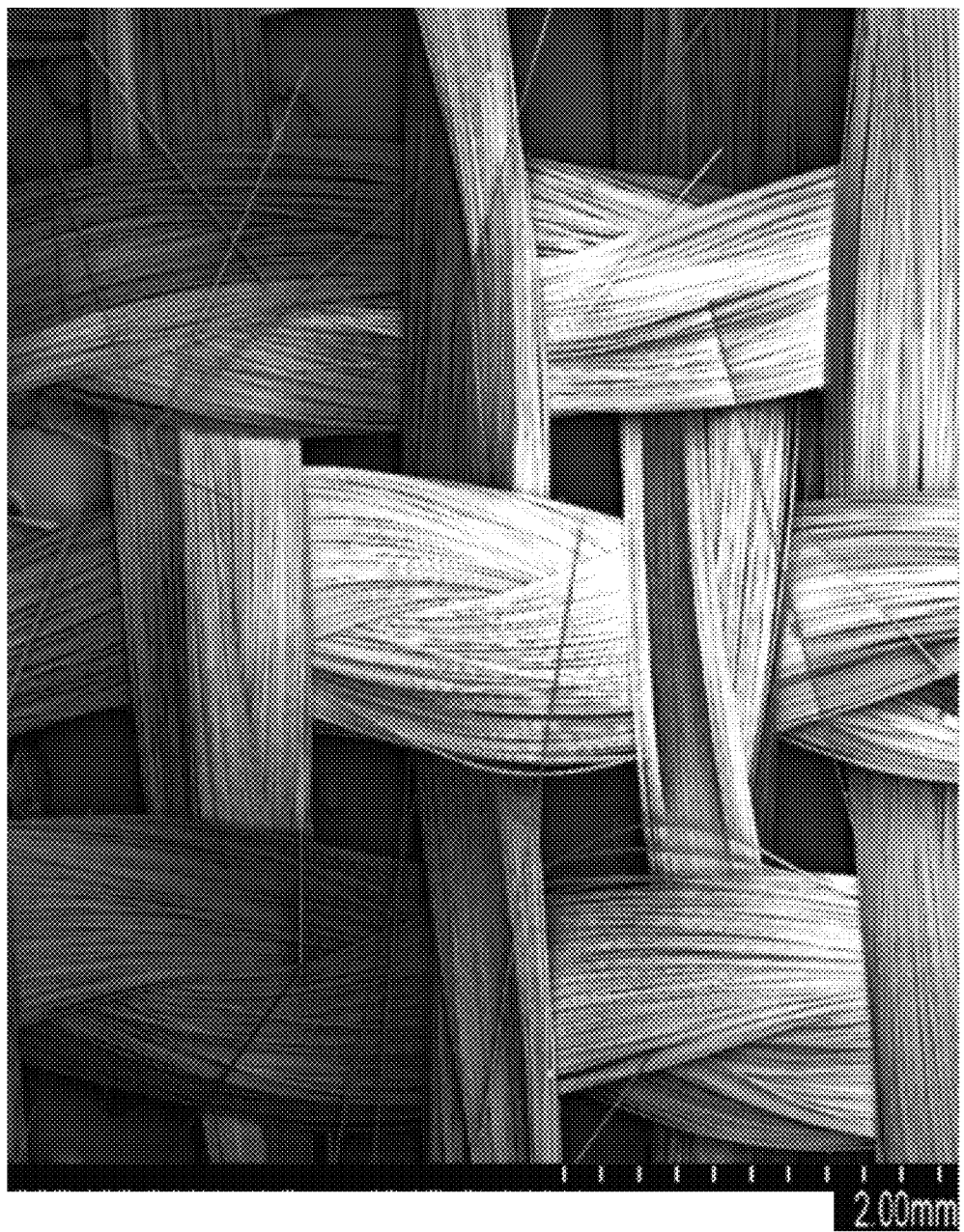

Comparative Example A was prepared as per Example 1 except that the second component was fabric style 6522 from BGF Industries comprising a plain weave fabric of continuous filament S-glass yarns (SCG 150 1/2). Based on a scanning electron micrograph image at a magnification level of 25 as shown in FIG. 5, the flame barrier cover was estimated to be from 75%-85%. There were 24 ends per inch (9.4 ends per cm) in the warp and 22 ends per inch (8.6 ends per cm) in the weft or fill. The fabric had an areal weight of 3.35 oz./sq.yd. (113 gsm) and a Frazier Air Permeability 373 Cu. ft./min.

Comparable Example A was subjected, in a ceding position, to the flame penetration test. The flame was applied on the Surlyn® film side of the composite. However, it lacked any effective flame barrier properties as, when exposed to flame, the sample faded flame penetration within 2 minutes after application of the flame source.

Example 2

Figure 6:

This example was prepared as per Example 1 except that the second component was fabric style 6781 from BGF Industries comprising an 8-harness satin weave fabric of continuous filament S-glass yarns (SCG 75 1/0). Based on a scanning electron micrograph image at a magnification level of 25 as shown in FIG. 6, the flame barrier cover was estimated to be at least 99.5%. There were 58 ends per inch (22.8 ends per cm) in the warp and 54 ends per inch (21.2 ends per cm) in the weft or fill. The fabric had an areal weight of 8.85 oz./sq.yd. (300 gsm) and a Frazier Air Permeability 32.5 Cu. ft./min. No polymeric resin or inorganic refractory coating was applied to the fabric. The composite sheet had a tensile strength of 414 N/cm (237 lb).

Example 2 was subjected, in a ceiling position, to the flame penetration test. The flame was applied on the Surlyn® film side of the composite. The sample showed a good resistance to flame penetration, with the second component acting as an effective barrier to 927° C.+/−38° C. (1700° F.+/−100° F.) flame, with no flame penetration of the specimen within 5 minutes after application of the flame source. The peak temperature measured at 4 inches above the upper surface of the horizontal test sample did not exceed 204° C. (400° F.). One of the examples experienced a flash over incident, the incident occurring within the first 90 seconds of the test and lasting for up to 30 seconds. During the incident, the second component was not breached by the flame.

Example 3

This example was prepared as per Example 1 except that the second component fabric was impregnated and B-staged with an polymeric siloxane resin blend from Flexible Ceramics Inc. The resin comprised 30 weight percent of the fabric weight. B-staging is a well-known term in the polymeric composites industry and is an intermediate stage in the reaction of certain thermosetting resins in which the material softens when heated and is plastic and fusible but may not entirely dissolve or fuse. The composite sheet had a tensile strength of 414 N/cm (237 lb).

The composite sheet of Example 3 was subjected, in a ceiling position, to the flame penetration test. The flame was applied on the Surlyn® film side of the composite. The sample showed a good resistance to flame penetration, with the second component acting as an effective barrier to 927° C.+/−38° C. (1700° F.+/−100° F.) flame, with no flame penetration of the specimen within 5 minutes after application of the flame source. The peak temperature measured at 4 inches above the upper surface of the horizontal test sample did not exceed 204° C. (400° F.).

Comparative Example B

This example was prepared as per Example 1 except that the second component comprised two layers of 1080 style E-glass fabric from BCF Industries thermally bonded to each other with a layer of a 0.025 mm (1 mil) thick polyurethane adhesive film containing up to 50 weight percent of a flame retardant ingredient. 1080 fabric is a plain weave fabric of continuous filament E-glass yarns (ECG 4150 1/0). The flame barrier cover was estimated to be from 69 to 75%. There were 60 ends per inch (23.6 ends per cm) in the warp and 47 ends per inch (18.5 ends per cm) in the weft or fill. The fabric had an areal weight of 1.38 oz./sq.yd. (47 gsm). No polymeric resin or inorganic refractory coating was applied to the fabric.

The example was subjected in a ceiling position to the flame penetration test. The flame was applied on the Surlyn® film side of the composite. However, it lacked any effective flame barrier properties as, when exposed to flame, the sample faded flame penetration within 1 minute after application of the flame source.

Comparative Example C

This example was prepared as per Example 1 except that the second component comprised three layers of style 1080 E-glass fabrics thermally bonded to each other with a layer of a 0,025 mm (1 mil) thick polyurethane adhesive film containing up to 50 weight percent of a flame retardant ingredient. No polymeric resin or inorganic refractory coating was applied to the fabric.

This example was subjected, in a ceiling position, to the flame penetration test. The flame was applied on the Surlyn® film side of the composite. However, it lacked any effective flame barrier properties as, when exposed to flame, the sample failed flame penetration within 1 minute after application of the flame source.

Example 4

A non-rigid composite sheet was prepared.
First Component
The first component comprised a woven 57680 style fabric from BGF (first fabric) thermally bonded with a layer of 0.025 mm (1 mil) polyurethane adhesive film containing up to 50 weight percent of a flame retardant ingredient to a white non-transparent 0.025 mm (1 mil) Tedlar® film (first polymeric layer) grade TWHB10E3 from DuPont. The fabric which had an aerial weight of 1220 gsm (3.6 oz./sq.yd.) was a plain weave having 28 ends per inch (11 ends/cm) in both warp and weft and was woven from 556 dtex (550 denier) p-aramid Kevlar® KM2 yarns, merge 1W034. The yarns had a nominal tenacity of 31 g/dtex.
Second Component
The second component was fabric style 6781 as in Example 2. The flame barrier cover was estimated to be at least 99.5%. No polymeric resin or inorganic refractory coating was applied to the fabric.

Third Component
The third component comprised a second polymeric layer, a white non-transparent 0.025 mm (1 mil) Tedlar® film grade TWHB10E3 from DuPont.

The first, second and third components were assembled together as shown in FIG. 2B. The second component was thermally bonded to the first and third components by with a layer of 0.025 mm (1 mil) polyurethane adhesive film containing up to 50 weight percent of a flame retardant ingredient. The composite sheet had a tensile strength of 168 N/cm (96 lb).

The fabricated composite sheet was subjected to the flame penetration test. The test sample was in a ceiling position, with the third component side of the composite facing the flame. The sample showed a good resistance to flame penetration, with the second component acting as an effective barrier to 927° C.+/−38° C. (1700° F.+/−100° F.) flame, with no flame penetration of the specimen within 5 minutes after application of the flame source. The peak temperature measured at 4 inches above the upper surface of the horizontal test sample did not exceed 204° C. (400° F.). None of the individual samples experienced a flash over incident.

Example 5

This example was prepared and tested as per Example 4 except that test duration was extended to 11 minutes. The sample showed a good resistance to flame penetration, with the second component acting as an effective barrier to 927° C.+/−38° C. (1700° F.+/−100° F.) flame, with no flame penetration of the specimen within 11 minutes after application of the flame source. The peak temperature measured at 4 inches above the upper surface of the horizontal test sample did not exceed 204° C. (400° F.). None of the individual samples experienced a flash over incident.

Example 6

This example was prepared and tested as per Example 4 except that the first component side of the composite was facing the flame during the test. The sample showed a good resistance to flame penetration, with the second component acting as an effective barrier to 927° C.+/−38° C. (1700° F.+/−100° F.) flame, with no flame penetration of the specimen within 5 minutes after application of the flame source. The peak temperature measured at 101.6 mm (4 inches) above the upper surface of the horizontal test sample did not exceed 204° C. (400° F.). None of the individual samples experienced a flash over incident.

Example 7

This example was prepared and tested as per Example 4 except that the first and the second fabrics were quilted together by an aromatic polyamide yarn instead of a thermal bonding with an adhesive film. A square quilting pattern was used, with the distance between adjacent rows of quilt stitches being about 101.6 mm (4 inches).

The fabricated composite sheet was subjected to the flame penetration test. The rest sample was in a ceiling position, with the third component side of the composite facing the flame. The sample showed a good resistance to flame penetration, with the second component acting as an effective barrier to 927° C.+/−38° C. (1700° F.+/−100° F.) flame, with no flame penetration of the specimen within 5 minutes after application of the flame source. The peak temperature measured at 101.6 mm (4 inches) above the upper surface of the horizontal test sample did not exceed 204° C. (400° F.). None of the individual samples experienced a flash over incident,

Example 8

This example was prepared and tested as per Example 7 except that the first component side of the composite was facing the flame during the test. The sample showed a good resistance to flame penetration, with the second component acting as an effective barrier to 927° C.+/−38° C. (1700° F.+/−100° F.) flame, with no flame penetration of the specimen within 5 minutes after application of the flame source. The peak temperature measured at 101.6 mm above the upper surface of the horizontal test sample did not exceed 204° C. (400° F.). None of the individual samples experienced a flash over incident.

Example 9

This example was prepared as per Example 4 except that the second component was fabric style 6580 from BGF Industries that comprised an 8-harness satin weave fabric of continuous filament S-glass yarns. The flame barrier cover was estimated to be at least 99.5%. There were 73 ends per inch (28.7 ends per cm) in the warp and 70 ends per inch (27.5 ends per cm) in the weft or fill. The fabric had an areal weight of 189 gsm (5.58 oz./sq.yd.). No polymeric resin or inorganic refractory coating was applied to the fabric.

The example was subjected, in a ceiling position, to the flame penetration test, with the third component side of the composite facing the flame. The sample showed a good resistance to flame penetration, with the second fabric acting as an effective barrier to 927° C.+/−38° C. (1700° F.+/−100° F.) flame, with no flame penetration of the specimen within 5 minutes after application of the flame source. The peak temperature measured at 4 inches above the upper surface of the horizontal test sample did not exceed 204° C. (400° F.). None of the individual samples experienced a flash over incident.

Example 10

This example was prepared as per Example 9 except that the third component comprised a woven fabric (third fabric) thermally bonded with a layer of 0.025 mm (1 mil) polyurethane adhesive film containing up to 50 weight percent of a flame retardant ingredient to a white non-transparent 0.025 mm (1 mil) Tedlar® film (second polymeric layer) grade TWHB10E3 from DuPont. The 5768 style fabric from BGF had an areal weight of 122 gsm (3.6 oz./sq.yd.). The fabric was a plain weave having 28 ends per inch in both warp and weft and was woven from 556 dtex (500 denier) p-aramid Kevlar® KM2+ yarns, merge 1W034. The yarns had a nominal tenacity of 31 g/dtex. The composite sheet had a tensile strength of 294 N/cm (168 lb).

The example was subjected, in a ceiling position, to the flame penetration test, with the third component side of the composite facing the flame. The sample showed a good resistance to flame penetration, with the second fabric acting as an effective barrier to 927° C.+/−38° C. (1700° F.+/−100° F.) flame, with no flame penetration of the specimen within 5 minutes after application of the flame source. The peak temperature measured at 4 inches above the upper surface of the horizontal test sample did not exceed 204° C. (400° F.). None of the individual samples experienced a flash over incident.

Example 11

An example may be prepared as per Example 1 except that the fabric of the second component had fewer ends per inch in both warp and weft so as to give an estimated flame barrier cover of 98%. If subjected, in a ceiling position, to the flame penetration test, with the third component side of the composite facing the flame, the sample is expected to show a good resistance to flame penetration, with the second fabric acting as an effective barrier to 927° C.+/−38° C. (1700° F.+/−100° F.) flame, with no flame penetration of the specimen within 5 minutes after application of the flame source.

Example 12

An example may be prepared as per Example 1 except that the fabric of the second component had fewer ends per inch in both warp and weft so as to give an estimated flame barrier cover of 95%. If subjected, in a ceiling position, to the flame penetration test, with the third component side of the composite facing the flame, the sample is expected to show a good resistance to flame penetration, with the second fabric acting as an effective barrier to 927° C.+/−38° C. (1700° F.+/−100° F.) flame, with no flame penetration of the specimen within 5 minutes after application of the flame source.

What is claimed is:
1. A non-rigid composite sheet comprising in order
   (i) a first component having an areal weight of from 88 to 678 gsm comprising a first fabric of continuous filament yarns, the yarns having a tenacity of at least 11 g/dtex and a first polymeric layer,
   (ii) a second component comprising at least one second fabric of continuous filament glass yarns, the second fabric being a woven fabric having an areal weight of from 170 to 339 gsm and adjacent to the first fabric of the first component, and
   (iii) a third component comprising a second polymeric layer,
   wherein
   (a) the first fabric is a woven fabric having an areal weight of from 70 to 508 gsm comprising yarns of aromatic polyamide, aromatic copolyamide, glass fiber or carbon fiber,
   (b) the polymer of the first and second polymeric layers is polyurethane, polyethylene, polypropylene, polyethylenenaphthalate, polyacrylonitrile, fluoropolymer, polyimide, polyketone, polyimide, polysulfone, polyarlene sulfide, liquid crystal polymer, polycarbonate or an ionomer, and
   (c) when the second fabric is free of a polymeric coating, the fabric has a flame barrier cover of at least 90% when measured over a minimum area of 645 sq. mm. of fabric surface, an areal weight of at least 136 gsm and the fabric comprises fiber having a nominal filament tensile strength of at least 3.4 GPa, or when the second fabric further comprises a polymeric coating on the surface of, or impregnated into the fabric, the coated fabric has a flame barrier cover of at least 90% when measured over a minimum area of 645 sq. mm. of fabric surface, an areal weight of at least 30 gsm and the fabric comprises fiber having a having a nominal filament tensile strength of at least 3.4 GPa and the polymeric coating is present in an amount of from 20 to 50 weight percent of the fabric weight with the proviso that, when the fabric prior to coating has a flame barrier cover of less than 90% and/or the fabric weight prior to coating is less than 135 gsm, then the coating weight is at least 50 gsm.

2. The composite of claim 1 wherein the polymer of the polymer coating of the second component is polyureasilazane, polycarbosilane, polysilazane, polysiloxane or silicon-carboxyl resin.

3. The composite of claim 1 wherein the third component further comprises a third woven fabric of continuous filament yarns having a yarn tenacity of at least 11 g/dtex, the third fabric being adjacent to the second fabric of the second component, the third fabric further having an areal weight of from 70 to 508 gsm and comprises yarns of aromatic polyamide, aromatic copolyamide, glass fiber or carbon fiber.

4. The composite of claim 1, wherein second component further comprises an inorganic refractory material on the surface of, or impregnated into, the second fabric, the refractory material being present in an amount of from 3 to 10 weight percent of the second fabric.

5. The composite of claim 1, wherein the sheet can withstand a flame temperature of 927 degrees C. for 5 minutes without burn-through penetration.

6. The composite of claim 1, wherein the sheet can withstand a flame temperature of 927 degrees C. for 5 minutes without burn-through penetration and the temperature 101 mm away from the side of the sheet remote from the flame does not exceed 204° C.

7. The composite of claim 1, wherein the composite sheet has a break strength of at least 350 N/cm (200 lb. per in.).

8. The composite of claim 1 wherein the fluoropolymer of the first or second polymeric layer is polyvinyl fluoride.

9. The composite of claim 1, wherein the first fabric has an areal weight from 101 to 170 gsm and the third fabric has an areal weight from 170 to 270 gsm.

10. The composite of claim 9, wherein the first fabric has an areal weight from 101 to 373 gsm.

11. A cargo container comprising a frame assembly, a plurality of side walls, a ceiling and a floor wherein the sidewalls and ceiling comprise the non-rigid composite sheet of claim 1.

12. A fire-resistant cover, separator, blanket or liner comprising the non-rigid composite sheet of claim 1.

13. A non-rigid composite sheet comprising in order
(i) a first component having an areal weight of from 88 to 678 gsm comprising a first fabric of continuous filament yarns, the yarns having a tenacity of at least 11 g/dtex and a first polymeric layer, the first fabric being bonded to the first polymeric layer,
(ii) a second component comprising at least one second fabric of continuous filament glass yarns, the second fabric being a woven fabric having an areal weight of from 170 to 339 gsm and adjacent to and bonded to the first fabric of the first component, and
(iii) a third component comprising a second polymeric layer, the second polymeric layer being bonded to the second fabric,
wherein
(a) the first fabric is a woven fabric has an areal weight of from 70 to 508 gsm and comprises yarns of aromatic polyamide, aromatic copolyamide, glass fiber or carbon fiber,
(b) the polymer of the first and second polymeric layers is polyurethane, polyethylene, polypropylene, polyethylenenaphthalate, polyacrylonitrile, fluoropolymer, polyimide, polyketone, polyimide, polysulfone, polyarlene sulfide, liquid crystal polymer, polycarbonate or an ionomer, and
(c) when the second fabric is free of a polymeric coating, the fabric has a flame barrier cover of at least 90% when measured over a minimum area of 645 sq. mm. of fabric surface, an areal weight of at least 136 gsm and the fabric comprises fiber having a nominal filament tensile strength of at least 3.4 GPa, or when the second fabric further comprises a polymeric coating on the surface of, or impregnated into the fabric, the coated fabric has a flame barrier cover of at least 90% when measured over a minimum area of 645 sq. mm. of fabric surface, an areal weight of at least 30 gsm and the fabric comprises fiber having a having a nominal filament tensile strength of at least 3.4 GPa and the polymeric coating is present in an amount of from 20 to 50 weight percent of the fabric weight with the proviso that, when the fabric prior to coating has a flame barrier cover of less than 90% and/or the fabric weight prior to coating is less than 135 gsm, then the coating weight is at least 50 gsm.

14. A non-rigid composite sheet comprising in order
(i) a first component having an areal weight of from 88 to 678 gsm comprising a first fabric of continuous filament yarns, the yarns having a tenacity of at least 11 g/dtex and a first polymeric layer, the first fabric being bonded to the first polymeric layer,
(ii) a second component comprising at least one second fabric of continuous filament glass yarns, the second fabric being a woven fabric having an areal weight of from 170 to 339 gsm and adjacent to and bonded to the first fabric of the first component, and
(iii) a third component comprising a third fabric of continuous filament yarns having a tenacity of at least 11 g/dtex, the third fabric being adjacent to and bonded to the second fabric, and a second polymeric layer, the second polymeric layer being bonded to the third fabric,
wherein
(a) the first and third fabric is a woven fabric has an areal weight of from 70 to 508 gsm and comprises yarns of aromatic polyamide, aromatic copolyamide, glass fiber or carbon fiber,
(b) the polymer of the first and second polymeric layers is polyurethane, polyethylene, polypropylene, polyethylenenaphthalate, polyacrylonitrile, fluoropolymer, polyimide, polyketone, polyimide, polysulfone, polyarlene sulfide, liquid crystal polymer, polycarbonate or an ionomer, and
(c) when the second fabric is free of a polymeric coating, the fabric has a flame barrier cover of at least 90% when measured over a minimum area of 645 sq. mm. of fabric surface, an areal weight of at least 136 gsm and the fabric comprises fiber having a nominal filament tensile strength of at least 3.4 GPa, or when the second fabric further comprises a polymeric coating on the surface of, or impregnated into the fabric, the coated fabric has a flame barrier cover of at least 90% when measured over a minimum area of 645 sq. mm. of fabric surface, an areal weight of at least 30 gsm and the fabric comprises fiber having a having a nominal filament tensile strength of at least 3.4 GPa and the polymeric coating is present in an amount of from 20 to 50 weight percent of the fabric weight with the proviso that, when the fabric prior to coating has a flame barrier cover of less than 90% and/or the fabric weight prior to coating is less than 135 gsm, then the coating weight is at least 50 gsm.

15. The composite sheet of claim 13 or 14 wherein the fabrics and polymeric layers are bonded by an adhesive.

* * * * *